US009512787B2

(12) United States Patent
Paul

(10) Patent No.: US 9,512,787 B2
(45) Date of Patent: Dec. 6, 2016

(54) SWITCHOVER VALVE UNIT AND INTERNAL COMBUSTION ENGINE HAVING A SWITCHOVER VALVE UNIT OF SAID TYPE

(71) Applicant: Dr. Ing. h.c. F. Porsche Aktiengesellschaft, Stuttgart (DE)

(72) Inventor: Michael Paul, Weissach (DE)

(73) Assignee: Dr. Ing. h.c. F. Posche Aktiengesellschaft (DE)

( * ) Notice: Subject to any disclaimer, the term of this patent is extended or adjusted under 35 U.S.C. 154(b) by 202 days.

(21) Appl. No.: 14/557,484

(22) Filed: Dec. 2, 2014

(65) Prior Publication Data

US 2015/0152794 A1  Jun. 4, 2015

(30) Foreign Application Priority Data

Dec. 4, 2013   (DE) .......................... 10 2013 113 432

(51) Int. Cl.
*F02B 75/04* (2006.01)
*F02D 15/02* (2006.01)
*F16C 7/06* (2006.01)

(52) U.S. Cl.
CPC ............. *F02D 15/02* (2013.01); *F02B 75/045* (2013.01); *F16C 7/06* (2013.01)

(58) Field of Classification Search
CPC .... F02B 75/044; F02B 75/045; F02B 75/32; F02D 15/02; F16C 7/06
USPC ............. 123/48 A, 48 B, 41.37, 78 E, 197.4, 123/197.3
See application file for complete search history.

(56) References Cited

U.S. PATENT DOCUMENTS

| | | | | |
|---|---|---|---|---|
| 1,926,598 A | * | 9/1933 | Peterson | ................... F02B 1/00 |
| | | | | 123/78 R |
| 7,533,638 B1 | * | 5/2009 | Berger | .................. F02B 75/045 |
| | | | | 123/48 B |
| 2010/0139479 A1 | * | 6/2010 | Pirault | .................. F02B 75/044 |
| | | | | 92/181 P |

FOREIGN PATENT DOCUMENTS

| | | | | |
|---|---|---|---|---|
| DE | 102005055199 A1 | * | 5/2007 | ............ F02B 75/045 |
| DE | 10 2010 016 037 | | 9/2011 | |
| DE | 102010061361 A1 | * | 4/2012 | ............. F02D 15/02 |
| DE | 102011056298 A1 | * | 6/2013 | ............ F02B 75/045 |
| DE | 102013021065 A1 | * | 6/2015 | ............ F02B 75/045 |

* cited by examiner

*Primary Examiner* — John Kwon
*Assistant Examiner* — Tea Holbrook
(74) *Attorney, Agent, or Firm* — Gerald E. Hespos; Michael J. Porco; Matthew T. Hespos

(57) ABSTRACT

A switchover valve unit (36) for an internal combustion engine that has an adjustable compression ratio for controlling an hydraulic oil stream in hydraulic chambers (22, 23) of an eccentric adjustment device. The hydraulic chambers (22, 23) can be filled with hydraulic oil via hydraulic oil feed lines (24, 25), and ventilation of the hydraulic chambers (23, 24) via hydraulic oil discharge lines (30, 31) is permitted or not permitted depending on a switching position of the switchover valve unit (36). The switchover valve unit (36) having an actuating module (53) with a linearly displaceable pick-off element (37), a valve module (56) with ventilation valves (41, 42) in the hydraulic oil discharge lines (30, 31), and actuating rods (39, 40) that can be displaced linearly by the pick-off element (37). The ventilation valves (41, 42) are opened or closed depending on the switching position of the pick-off element (37).

10 Claims, 4 Drawing Sheets

SWITCHOVER VALVE UNIT AND INTERNAL COMBUSTION ENGINE HAVING A SWITCHOVER VALVE UNIT OF SAID TYPE

CROSS REFERENCE TO RELATED APPLICATION

This application claims priority under 35 USC 119 to German Patent Appl. No. 10 2013 113 432.7 filed on Dec. 4, 2013, the entire disclosure of which is incorporated herein by reference.

BACKGROUND

1. Field of the Invention

The invention relates to a switchover valve unit for an internal combustion engine with an adjustable compression ratio, and to an internal combustion engine.

2. Description of the Related Art

DE 10 2010 016 037 A1 and FIG. 1 herein show a connecting rod 10 of an internal combustion engine with an adjustable compression ratio. More particularly, the connecting rod 10 shown in FIG. 1 has a crankpin bearing eye 11 and a connecting rod bearing eye 12. The crankpin bearing eye 11 is used connects the connecting rod 10 to a crankshaft (not shown in FIG. 1), and the connecting rod bearing eye 12 connects the connecting rod 10 to a cylinder piston (not shown in FIG. 1) of the internal combustion engine. The connecting rod 10 is assigned an eccentric adjustment device 13 that has an eccentric body 14 and eccentric rods 15, 16. The eccentric body 14 has a piston pin bore that is arranged eccentrically with respect to a central point 17 of the connecting rod bearing eye 12, with a central point 18. The piston pin bore receives a piston pin. The eccentric adjustment device 13 is used to adjust an effective connecting rod length $I_{eff}$. The connecting rod length is understood as the distance between the central point 18 of the piston pin bore and a central point 19 of the crankpin bearing eye 11. The eccentric rods 15, 16 of the eccentric adjustment device 13 are displaceable to rotate the eccentric body 14 and thus to change the effective connecting rod length $I_{eff}$. Each eccentric rod 15 is assigned a piston 20 and 21 that is mounted or guided displaceably in a hydraulic chamber 22 and 23.

Hydraulic pressure in the hydraulic chambers 22, 23 acts on the pistons 20 and 21 respectively assigned to the eccentric rods 15, 16. The displacement of the eccentric rods 15, 16 is possible or is not possible in a manner dependent on the amount of oil in the hydraulic chambers 22, 23.

The adjustment of the eccentric adjustment device 13 is initiated by action of mass and load forces of the internal combustion engine that act on the eccentric adjustment device 13 during a working stroke of the internal combustion engine. During a working stroke, the directions of action of the forces acting on the eccentric adjustment device 13 change continuously. The adjustment movement is assisted by the pistons 20, 21. The pistons 20, 21 are acted on by hydraulic oil and act on the eccentric rods 15, 16. Thus, the pistons 20, 21 prevent a return movement of the eccentric adjustment device 13 due to varying directions of force action of the forces acting on the eccentric adjustment device 13. The eccentric rods 15, 16 that interact with the pistons 20, 21 are connected to the eccentric body 14 on both sides. The hydraulic chambers 22 and 23 in which the pistons 20 and 21 are guided can be charged or filled with hydraulic oil from the crankpin bearing eye 11 via hydraulic oil feed lines 24 and 25. Check valves 26 and 27 prevent a backflow of the hydraulic oil from the hydraulic chambers back into the hydraulic oil feed lines 24 and 25. A switchover valve 29 is accommodated in a bore 28 of the connecting rod 10. The hydraulic chambers 22 and 23 are in contact, via hydraulic oil discharge lines 30 and 31 respectively, with the bore 28 that accommodates the switchover valve 29. The switching position of the switchover valve 29 determines which of the hydraulic chambers 22 and 23 is filled with hydraulic oil and which of the hydraulic chambers 22 and 23 is evacuated. Thus, the adjustment direction or direction of rotation of the eccentric adjustment device 13 is dependent on this.

The switchover valve 29 of DE 10 2010 016 037 A1 comprises an actuating element 32, a restoring spring 33 and a control piston 34.

As stated, the pistons 20, 21 of the eccentric rods 15, 16 are guided in the hydraulic chambers 22, 23, and the hydraulic oil that acts on the pistons 20, 21 is supplied to the hydraulic chambers 22, 23 from the crankpin bearing eye 11 via the hydraulic oil feed lines 24 and 25. The connecting rod 10 engages by way of the crankpin bearing eye 11 on the crankshaft (not shown in FIG. 1) such that a connecting rod bearing shell 35 is arranged between the crankshaft, specifically a crankshaft bearing journal thereof, and the crankpin bearing eye 11.

The hydraulic chambers 22, 23 can be ventilated in a manner dependent on the switching position of the switchover valve 29, via the hydraulic oil discharge lines 30, 31. The adjustment direction or direction of rotation of the eccentric adjustment device 13 is dependent on this.

The switchover valve 29 of DE 10 2010 016 037 A enables the adjustment direction or direction of rotation of the eccentric adjustment device to be influenced in an effective manner. However, there is a demand for a switchover valve that can be manufactured and assembled more easily.

It is an object of the invention to provide a novel switchover valve unit for an internal combustion engine with an adjustable compression ratio, and an internal combustion engine having such a switchover valve unit.

SUMMARY OF THE INVENTION

The switchover valve unit according to the invention has an actuating module with a linearly displaceable pick-off element. The switchover valve unit of the invention also has a valve module with ventilation valves that are in the form of seat valves and that are assigned to the hydraulic oil discharge lines. Furthermore, the switchover valve unit of the invention has actuating rods that can be displaced linearly by the pick-off element of the actuating module and by means of which the ventilation valves of the valve module are opened or closed. Thus the hydraulic oil discharge lines are opened up or blocked in a manner dependent on the switching position of the pick-off element.

The ventilation valves of the valve module provide a sealing function of the switchover valve unit. The pick-off element of the actuating module and the actuating rods provide the actuating function of the switchover valve unit.

The valve module and the actuating module can be preassembled separately, tested and installed on a connecting rod of an internal combustion engine.

The valve module of the switchover valve unit of the invention is installed in a recess of the connecting rod. Subsequently, the actuating rods of the switchover valve unit are installed on the connecting rod. The actuating module of the switchover valve unit then is installed in a recess of the connecting rod.

The switchover valve unit of the invention accordingly is characterized by a modular concept that permits simple manufacture and assembly.

When the pick-off element of the actuating module is in a first switching position, a first actuating rod opens a ventilation valve that is assigned to a first hydraulic oil discharge line of the valve module and thus connects a first hydraulic chamber via the first hydraulic oil discharge line to a ventilation duct. Additionally, when the pick-off element is in the first switching position, a ventilation valve that is assigned to a second hydraulic oil discharge line of the valve module is closed and thus separates a second hydraulic chamber from a ventilation duct. When the pick-off element of the actuating module is in a second switching position, a second actuating rod opens the ventilation valve that is assigned to the second hydraulic oil discharge line of the valve module and thus connects the second hydraulic chamber via the second hydraulic oil discharge line to the ventilation duct. Additionally, when the pick-off element is in the second switching position, the ventilation valve that is assigned to the first hydraulic line of the valve module is closed to separate the first hydraulic chamber from the ventilation duct. This embodiment of the assemblies are responsible for the sealing function of the switchover valve unit and for the actuating function of the switchover valve unit permits simple and reliable manufacture and assembly of the same.

The ventilation valves preferably are seat valves that have a valve body, a valve seat and a restoring spring. When the pick-off element is in the first switching position, the first actuating rod lifts the valve body of the first ventilation valve from the valve seat counter to the spring force of the restoring spring. Additionally, when the pick-off element is in the first switching position, the second actuating rod releases the valve body of the second ventilation valve. Thus, the spring force of the restoring spring forces the valve body of the second ventilation valve against the respective valve seat. When the pick-off element is in the second switching position, the second actuating rod lifts the valve body of the second ventilation valve from the valve seat counter to the spring force of the restoring spring. Additionally, when the pick-off element is in the second switching position, the first actuating rod releases the valve body of the first ventilation valve. Thus, the spring force of the restoring spring forces the valve body of the first ventilation valve against the respective valve seat. This embodiment is simple and reliable.

Exemplary embodiments of the invention will be explained in more detail on the basis of the drawing, without the invention being restricted to those embodiments.

DETAILED DESCRIPTION

The invention relates to an internal combustion engine with an adjustable compression ratio, and to a switchover valve unit for an internal combustion engine with an adjustable compression ratio.

Figure 1:
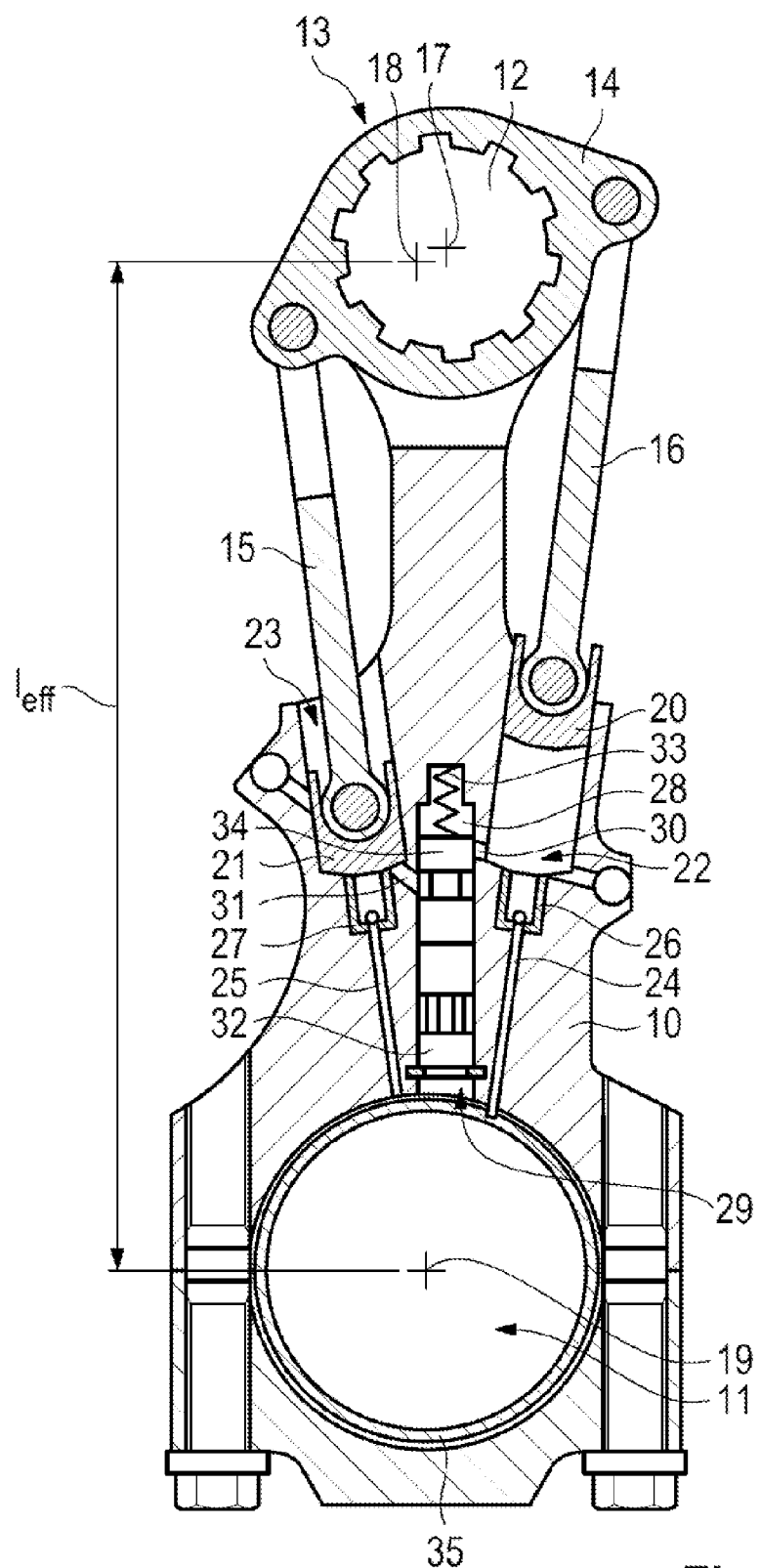
FIG. 1 shows a detail of an internal combustion engine with adjustable compression ratio, as known from the prior art.
Figure 2:
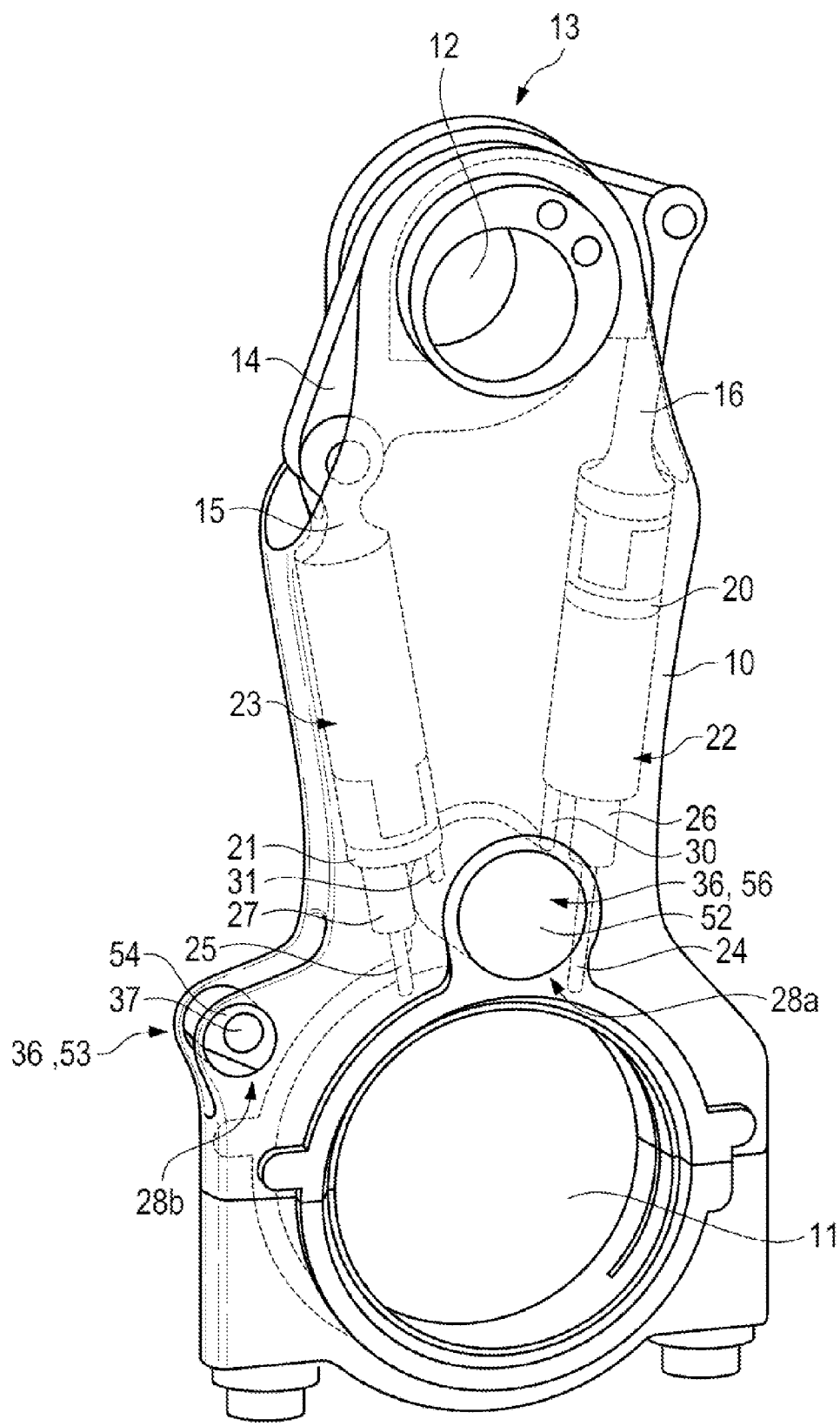
FIG. 2 shows a detail of an internal combustion engine according to the invention with adjustable compression ratio.

The basic construction of an internal combustion engine with adjustable compression ratio is familiar to a person skilled in the art and has been described with reference to FIG. 1. As shown in FIG. 2, an internal combustion engine of this type has at least one cylinder, preferably multiple cylinders. Each cylinder has a piston that is coupled by a connecting rod 10 to a crankshaft of the internal combustion engine. Each connecting rod 10 has a connecting rod bearing eye 12 at one end and a crankpin bearing eye 11 at an opposite end.

The crankpin bearing eye 11 of the respective connecting rod 10 engages on a crankshaft bearing journal of the crankshaft so that a connecting rod bearing shell 35 is positioned between the crankshaft bearing journal and the crankpin bearing eye 11. A lubricating oil film can build up between the respective connecting rod bearing shell 35 and the respective crankshaft bearing journal. An internal combustion engine with adjustable compression ratio has an eccentric adjustment device 13 in the region of each connecting rod 10 for adjusting the effective connecting rod length of the respective connecting rod. The eccentric adjustment device 13 has eccentric rods 15 and 16 that can be displaced in a manner dependent on a hydraulic pressure prevailing in hydraulic chambers 22, 23 that interact with the eccentric rods 15, 16 to adjust the compression ratio. Said hydraulic chambers 22, 23 that interact with the eccentric rods 15, 16 can be supplied with hydraulic oil from the crankpin bearing eye 11 of the respective connecting rod via hydraulic oil feed lines 24, 25, wherein check valves 26, 27 prevent a backflow of the oil into the hydraulic oil feed lines 24, 25. The adjustment of the eccentric adjustment device 13 is initiated by the action of mass and load forces of the internal combustion engine.

Assemblies of a switchover valve unit 36 of the invention are received in recesses or bores 28a, 28b of the connecting rod 10. The switching position of the switchover valve unit 36 determines which of the hydraulic chambers 22 and 23 is filled with hydraulic oil and which of the hydraulic chambers 22, 23 is evacuated. The hydraulic chambers 22, 23 are in contact with a recess or bore or a ventilation duct via hydraulic oil discharge lines 30, 31 in a manner dependent on the switching position of the switchover valve unit 36. The invention relates to details of the switchover valve unit 36.

The switchover valve unit 36 of the invention, by means of which the alternate filling and evacuation of the hydraulic chambers 22, 23 with hydraulic oil, and thus the adjustment direction of the eccentric adjustment device 13, can be influenced, has an actuating module 53 with a linearly displaceable pick-off element 37 that is guided for linear displacement in a cartridge-like sleeve 54 of the actuating module 53. The actuating module 53 can be mounted by way of the cartridge-like sleeve 54 in the recess 28b of the connecting rod 10. The linear displacement direction 38 of the pick-off element 37 extends approximately parallel to an axis of rotation of a crankshaft (not shown).

Figure 3:
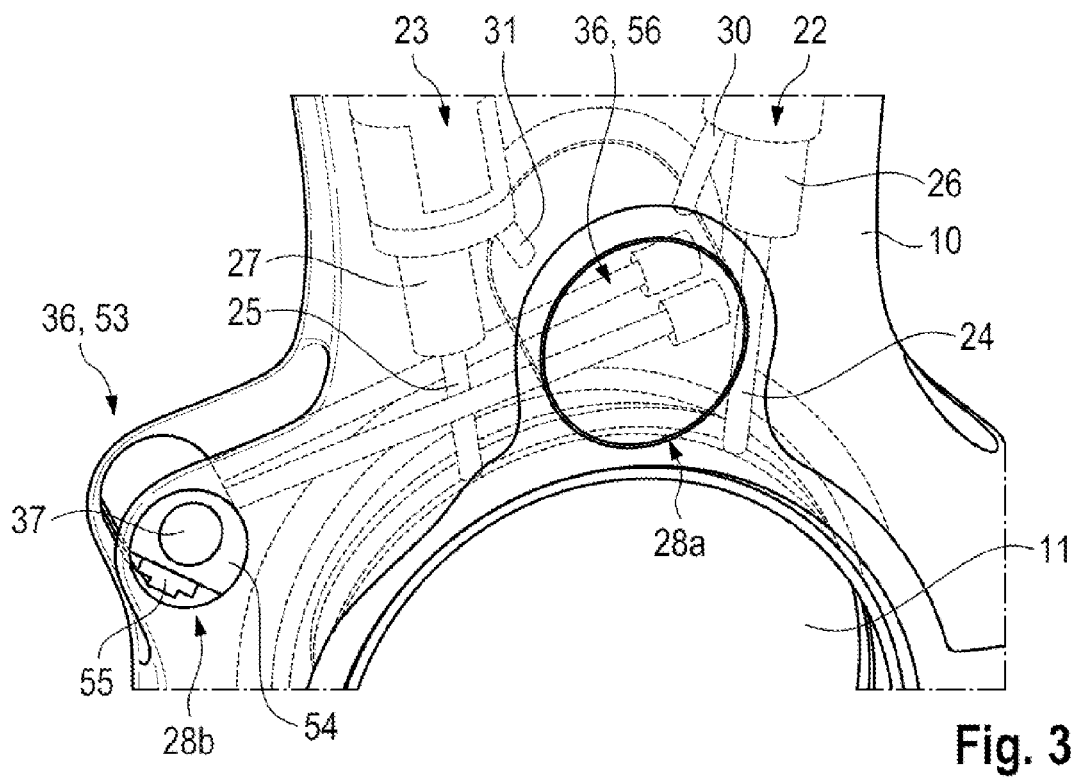
FIG. 3 shows a detail of FIG. 2.
Figure 4:
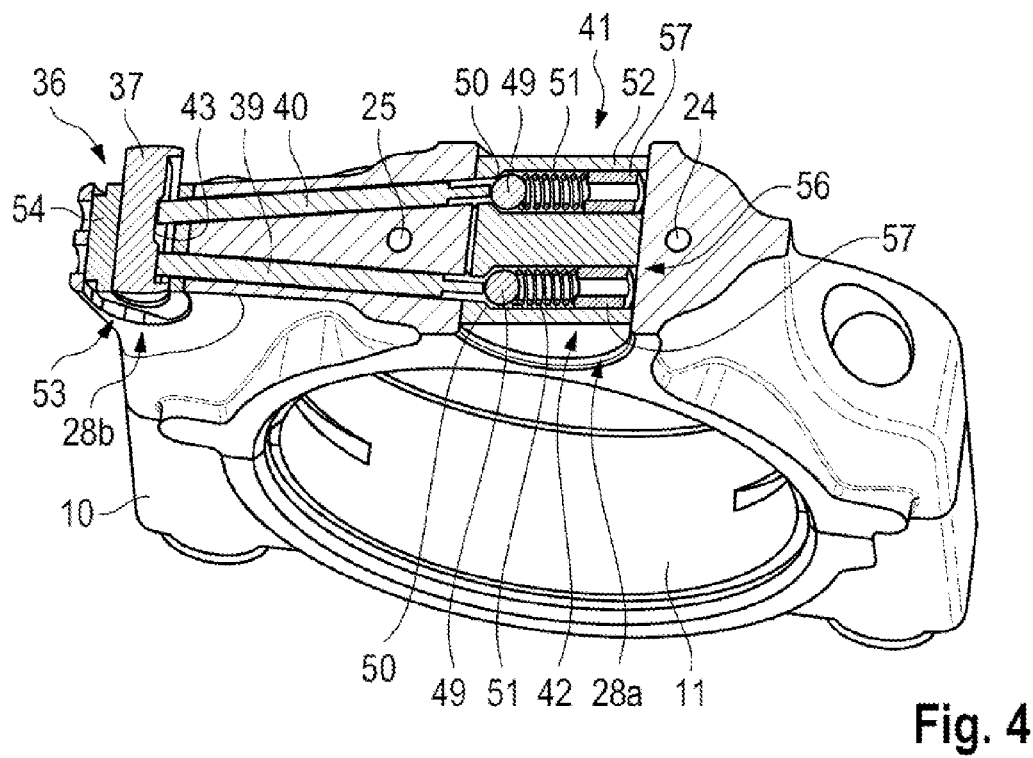
FIG. 4 shows a cross section through FIG. 2.

The actuating module 53 has a locking element 55 (see FIG. 3) for locking the pick-off element 37 in the sleeve 54 of the actuating module 53. The locking element 55 preferably has a locking ball (not shown) that is actuated by a spring (not shown) in the form of a leaf spring and that can lock the pick-off element 37 in the sleeve 54 of the actuating module 53 in the respective switching position of the pick-off element 37.

The switchover valve unit 36 of the invention comprises actuating rods 39, 40 that interact with the pick-off element 37 and by means of which, in a manner dependent on the switching position of the pick-off element 37 of the actuating module 53, ventilation valves 41, 42 of a valve module 56 of the switchover valve unit 36 of the invention can be opened and closed. Each hydraulic oil discharge line 30, 31, via which the respective hydraulic chamber 23, 24 can be ventilated, is respectively assigned a ventilation valve 41, 42 of the valve module 56. The ventilation valves 41, 42 of the valve module 56 alternately are opened or opened up, or closed or blocked, by the actuating rods 39, 40 in a manner dependent on the switching position of the pick-off element 37 of the actuating module 53. The actuating rods 39, 40 can be displaced linearly by the pick-off element 37 of the actuating module 53, specifically approximately perpendicular to the direction of displacement of the pick-off element 37 of the actuating module 53. The pick-off element 37 of the actuating module 53 has a cam-like contour 43 that interacts with first ends 44 of the actuating rods 39, 40 and that effects the displacement of the actuating rods 39, 40. Opposite, second ends 45 of the actuating rods 39, 40 function to actuate the ventilation valves 41, 42 of the valve module 56, which are in the form of seat valves.

Figure 5:
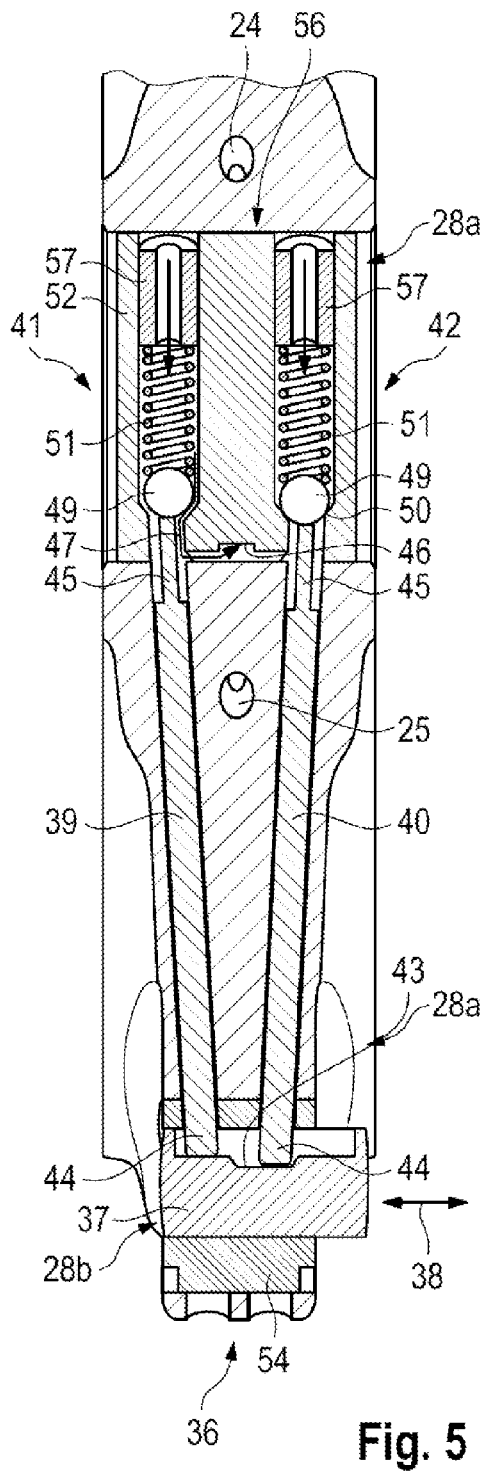
FIG. 5 shows the detail of FIG. 4 in a plan view in a first switching position.

A first ventilation valve 41 is in a first hydraulic oil discharge line 30 of the valve module 56. The first actuating rod 39 opens the first ventilation valve 41 when the pick-off element 37 of the actuating module 53 (see FIG. 5) is in a first switching position. Thus, a first hydraulic oil chamber 22 is connected to a ventilation duct 46 via the first hydraulic oil discharge line 30. As a result, the hydraulic oil chamber 22 can be ventilated via the first ventilation valve 41 of the valve module 56 in the direction of the arrow 47 shown in FIG. 5.

By contrast, in the first switching position (see FIG. 5), a second ventilation valve 42 in a second hydraulic oil discharge line 31 of the valve module 56 is closed so that the second hydraulic oil chamber 23 is separated from the ventilation duct 46.

The second actuating rod 40 is assigned to the second hydraulic oil discharge line 31 of the valve module 56. The second actuating rod 40 opens the second ventilation valve 42 when the pick-off element 37 of the actuating module 53 (see FIG. 6) is in the second switching position to connect the second hydraulic chamber 23 to the ventilation duct 46 via the second hydraulic oil discharge line 31 to ventilate the second hydraulic chamber 23.

Figure 6:
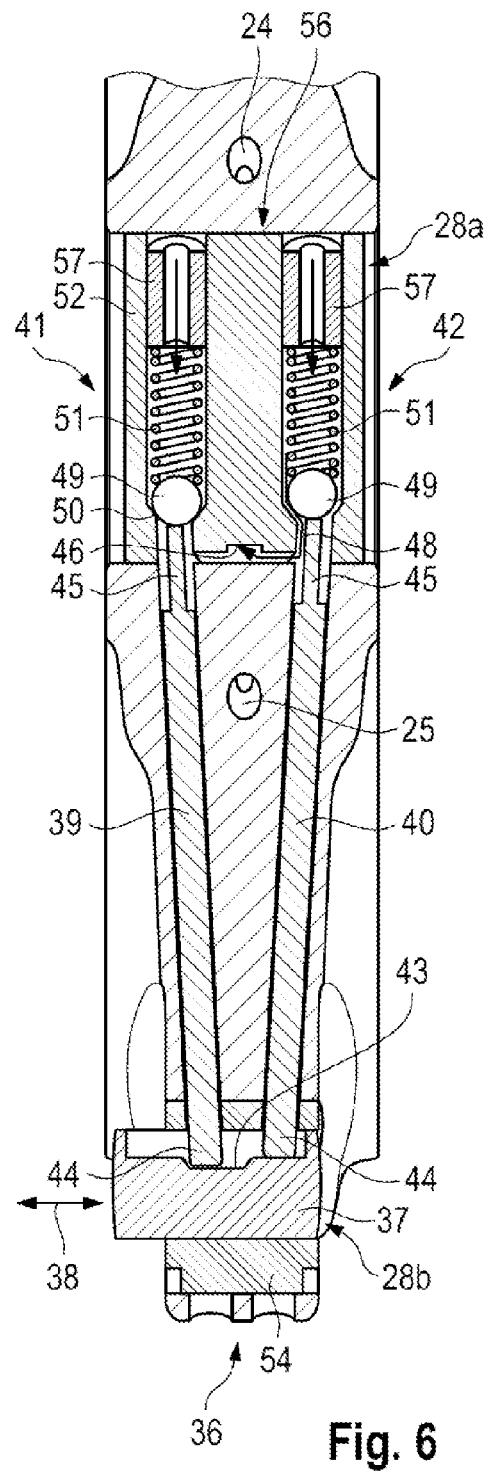
FIG. 6 shows the detail of FIG. 5 in a plan view in a second switching position.

The arrow 48 in FIG. 6 indicates ventilation of the second hydraulic oil chamber 23 in the direction of the ventilation duct 46 via the second ventilation valve 42 of the valve module 56. The first ventilation valve 41 is assigned to the first hydraulic oil discharge line 30 of the valve module 56 and is closed in the second switching position (see FIG. 6). Thus, the first hydraulic oil chamber 22 is separated from the ventilation duct 46. Both hydraulic oil chambers 22, 23 can be ventilated into the same ventilation duct 46 in the illustrated embodiment. However, it is possible for separate ventilation ducts to be formed for the hydraulic oil chambers 22, 23.

As noted above, both ventilation valves 41, 42 of the valve module 56 are seat valves. Thus, each ventilation valve 41, 42 has a ball-like valve body 49, a valve seat 50 that interacts with the valve body 49, and a restoring spring 51 that interacts with the valve body 49.

When the pick-off element 37 of the actuating module 53 (see FIG. 5) is in the first switching position, the second end 45 of the first actuating rod 39 lifts the valve body 48 of the first ventilation valve 41 of the valve module 56 from the valve seat 50 of the first ventilation valve 41 counter to the spring force of the restoring spring 51 of the first ventilation valve 41.

Furthermore, when the pick-off element 37 is in the first switching position, the second actuating rod 40 releases the valve body 48 of the second ventilation valve 42 of the valve module 56. Thus, the spring force of the restoring spring 51 of the second ventilation valve 42 presses the valve body 49 of said second ventilation valve against the valve seat 50 of the second ventilation valve 42.

When the pick-off element 37 of the actuating module 53 (see FIG. 6) is in the second switching position, the second end 45 of the second actuating rod 40 lifts the valve body 49 of the second ventilation valve 42 of the valve module 56 from the valve seat 50 of said second ventilation valve counter to the spring force of the restoring spring 51 of the second ventilation valve 42.

Furthermore, when the pick-off element 37 is in the second switching position, the first actuating rod 39 releases the valve body 49 of the first ventilation valve 41 of the valve module 56. Thus, the spring force of the restoring spring 51 of the first ventilation valve 41 presses the valve body 49 of the first ventilation valve 41 against the valve seat 50 of said first ventilation valve 41.

The switchover valve unit 36 of the invention comprises the valve module 56 with the two ventilation valves 41 and 42, the actuating module 53 with the pick-off element 37, and the two actuating rods 39 and 40 and is of modular construction.

The valve module 56 and the actuating module 53 can separately be preassembled, tested and installed into the recesses 28, 28b of the connecting rod 10 of an internal combustion engine. The valve module 56 initially is installed in the recess 28a of the connecting rod 10. Subsequently, the actuating rods 39, 40 are installed in corresponding bores of the connecting rod 10. The actuating module 53 then is installed in the recess 28b of the connecting rod 10.

The switchover valve unit 36 of the invention accordingly is characterized by a modular concept that permits simple manufacture and assembly. The two modules 53, 56 can be preassembled and tested outside the connecting rod 10. Only relatively simple bores for receiving the two modules 53, 56 and the actuating rods 39, 40 need to be formed and machined on the connecting rod 10.

As stated above, the two ventilation valves 41, 42 are combined to form the valve module 56. The valve seats 50 of the valve module 56 are formed by a monolithic or unipartite housing part 52 of cartridge-like and/or cylindrical form. Thus, the valve module 56 can be inserted in the manner of a cartridge into the bore 28b of the connecting rod 10. The valve bodies 49 can be pushed by the restoring springs 51 in the direction of the valve seats 50. The restoring springs 51 are supported on the respective valve body 49 of the respective ventilation valve 41, 42 of the valve module 56 and on an abutment body 57 of the respective ventilation valve 41, 42. Oil flows through the abutment bodies 57, which may be designed as throttles. It is possible for the outflow speed out of the hydraulic oil chambers 22, 23, and thus the adjustment time of the connecting rod 10, to be adjusted or influenced by abutment bodies 57 in the form of throttles.

An outer contour of the cylindrical housing part 52 of the valve module 56 is designed with grooves, such that the ventilation valves 41, 42 of the valve module 56 interact with the hydraulic oil discharge lines 30, 31.

The actuating module 53 is compact and can be inserted into the recess 28b of the connecting rod 10. The actuating module 53 comprises the pick-off element 37 that can be displaced linearly between its two switching positions relative to the cartridge-like cylindrical sleeve 54 of the actuator module 53 and can be locked in its switching positions. The pick-off element 37 of the actuating module 53 interacts with the actuating rods 39, 40. Thus, the linear movement of the pick-off element 37 is converted into a linear movement of the actuating rods 39, 40, offset through approximately 90° with respect thereto. The actuating rods 39, 40 in this case move opposite to one another. For structural space reasons, an axis of the pick-off element 37 of the actuating module 53 is offset relative to an axis of the cartridge-like, cylindrical sleeve 54 of the actuating module 53. Sleeve 54 and pick-off element 37 are accordingly axially offset. The actuating module 53, like the valve module 56, can be preassembled and tested outside the connecting rod 10.

What is claimed is:

1. A switchover valve unit for an internal combustion engine that has an adjustable compression ratio, the switchover valve unit controlling a hydraulic oil stream in hydraulic chambers of an eccentric adjustment device so that the hydraulic chambers can be filled with hydraulic oil via hydraulic oil feed lines, and ventilation of the hydraulic chambers via hydraulic oil discharge lines being permitted or not permitted in a manner dependent on the switching position of the switchover valve unit, the switchover valve unit comprising:
    an actuating module with a linearly displaceable pick-off element;
    a valve module with ventilation valves assigned to the hydraulic oil discharge lines; and
    actuating rods that can be displaced linearly by the pick-off element of the actuating module and being disposed so that movement of the actuating rods opens the ventilation valves of the valve module or permits closure of the ventilation valves so that the hydraulic oil discharge lines are opened in a manner dependent on the switching position of the pick-off element.

2. The switchover valve unit of claim 1, wherein the actuating module can be preassembled and tested as a module.

3. The switchover valve unit of claim 1, wherein the actuating module further comprises a cartridge-like sleeve that guides the pick-off element, and a locking element for locking the pick-off element.

4. The switchover valve unit of claim 3, wherein the valve module can be preassembled and tested as a module.

5. The switchover valve unit of claim 3, wherein the actuating module can be inserted, by way of the cartridge-like sleeve thereof, into a recess of a connecting rod, and in that the valve module and the cartridge-like main body thereof can be inserted into a further recess of the connecting rod.

6. The switchover valve unit of claim 1, wherein the valve module has a cartridge-like main body that receives the ventilation valves.

7. The switchover valve unit of claim 1, wherein, when the pick-off element of the actuating module is in a first switching position, a first actuating rod opens a ventilation valve in a first hydraulic oil discharge line of the valve module to connect a first hydraulic chamber to a ventilation duct via the first hydraulic oil discharge line and a ventilation valve of a second hydraulic oil discharge line of the valve module is closed and separates a second hydraulic chamber from the ventilation duct, and when the pick-off element of the actuating module is in a second switching position, a second actuating rod opens the ventilation valve of the second hydraulic oil discharge line of the valve module and connects the second hydraulic chamber to the ventilation duct via the second hydraulic oil discharge line, and when the pick-off element of the actuating module is in the second switching position, the ventilation valve of the first hydraulic oil discharge line of the valve module is closed and separates the first hydraulic chamber from the ventilation duct.

8. The switchover valve unit of claim 7, wherein the ventilation valves of the valve module each have a valve body, a valve seat and a restoring spring, when the pick-off element of the actuating module is in the first switching position, the first actuating rod lifts the valve body of the first ventilation valve of the valve module from the valve seat counter to a spring force of the restoring spring and the second actuating rod releases the valve body of the second ventilation valve of the valve module, and when the pick-off element of the actuating module is in the second switching position, the second actuating rod lifts the valve body of the second ventilation valve of the valve module from the valve seat counter to the spring force of the restoring spring, and the first actuating rod releases the valve body of the first ventilation valve of the valve module.

9. The switchover valve unit of claim 8, wherein the valve seat of both ventilation valves of the valve module are formed by a cartridge-like main body.

10. An internal combustion engine with an adjustable compression ratio, having at least one cylinder and having a crankshaft on which at least one connecting rod engages, wherein the or each connecting rod has a crankpin bearing eye for connection of said connecting rod to the crankshaft, a connecting rod bearing eye for connection of said connecting rod to a piston of a cylinder, and an eccentric adjustment device for adjustment of an effective connecting rod length, wherein the respective eccentric adjustment device has eccentric rods which are acted on by a hydraulic pressure prevailing in hydraulic chambers that interact with the eccentric rods, and wherein the hydraulic pressure prevailing in the hydraulic chambers can be adjusted by the switchover valve unit of claim 1.

* * * * *